United States Patent [19]

Donohue

[11] 3,725,310
[45] Apr. 3, 1973

[54] SEMICONDUCTING CADMIUM CADMIUM-ZINC AND MERCURY PHOSPHIDE HALIDES

[75] Inventor: Paul Christopher Donohue, Wilmington, Del.

[73] Assignee: E. I. du Pont de Nemours and Company, Wilmington, Del.

[22] Filed: Aug. 10, 1971

[21] Appl. No.: 170,622

Related U.S. Application Data

[63] Continuation-in-part of Ser. No. 24,821, April 1, 1970, abandoned.

[52] U.S. Cl. ................252/518, 252/501, 23/368, 252/62.3 ZB, 338/18
[51] Int. Cl. ........................H01b 1/06, C01g 11/00
[58] Field of Search ..252/501, 518, 62.3 R, 62.3 ZB; 23/367, 368; 338/18

[56] References Cited

UNITED STATES PATENTS 3,303,005   2/1967   Suchow..................................23/367

OTHER PUBLICATIONS

L. Suchow et al., J. Electrochem. Soc. 110, 776 (1963).
H. Puff et al., Naturwiss. 52, 452 (1965).
H. Puff et al., Z. Anorg. Allg. Chem. 343, 259 (1966).
Podinov et al., Radiokkimiya 8, 556 (1966).
P. Lemoult, Compt. Rendu, 145, 1175 (1907).
D. Grdenic et al., Arhiv. Za Kemiju 24, 61 (1952).
H. Puff, Angew. Chem. 74, 659 (1962).
H. Puff et al., Z. Anorg. Allg. Chem. 349, 39 (1967).

Primary Examiner—Charles E. Van Horn
Attorney—Anthony P. Mentis

[57] ABSTRACT

Disclosed are phosphide halides of cadmium, cadmium-zinc, and mercury which are semiconductors and which may be doped with materials such as indium, copper, magnesium, and the like. The compositions are useful in semiconductor devices such as thermistors, rectifiers and visible light and infrared detectors.

17 Claims, No Drawings

SEMICONDUCTING CADMIUM CADMIUM-ZINC AND MERCURY PHOSPHIDE HALIDES

CROSS REFERENCE TO RELATED APPLICATION

This application is a continuation-in-part of my copending application Ser. No. 24,821, filed Apr. 1, 1970 and now abandoned.

BACKGROUND OF THE INVENTION

1. Field of the Invention

This invention relates to new cadmium, cadmium-zinc, and mercury phosphide halides.

2. Description of the Prior Art

A number of phosphide halides, antimonide halides, and arsenide halides of cadmium and mercury have been reported previously. Semiconductive cadmium pnictide halides of formula $Cd_4Y_2X_3$, in which Y is an element selected from Group V-A of the Periodic Table and X is an element selected from Group VII-A of the Periodic Table have been described by L. Suchow in U.S. Pat. No. 3,303,005. Compounds with cubic crystal structure and formula $Cd_4(P,As)_2(Cl,Br,I)_3$ have been described by L. Suchow and N. R. Stemple in J. Electrochem. Soc. 110, 766 (1963). The cadmium arsenide halides $Cd_4As_2Cl_3$, $Cd_4AsCl_3$, $Cd_2AsCl_2$, and $Cd_3AsCl_3$ have been reported by H. Puff, et al. in Naturwissenschaften 52, 452 (1965) and in Z. Anorg. Allg. 343, 259 (1966). Cadmium antimonide iodide, $Cd_4Sb_2I_3$, has been reported by H. Puff and H. Gotta, Z. Anorg. Allg. Chem. 341, 324 (1965). Substances formulated as $P(CdCl)_3$, $P(CdI)_3$, etc. have been reported by Y. I. Podinov and V. R. Klokman, Radiokhimiya 8, 556 (1966).

The mercury antimonide Halides $Hg_4Sb_2I_3$, $Hg_3SbI_4$, $HgSbBr$, and $Hg_2SbBr_2$ have been reported by H. Puff and H. Gotta in Z. Anorg. Allg. Chem. 333, 280 (1964), 337, 157 (1965) and Naturwissenschaften 51, 535 (1964). S. Prasted and coworkers have reported $Hg_2SbBr_5$, $HgSbBr_5$, $Hg_2SbCl_5$, and $HgSbCl_5$ in the J. Indian Chem. Soc. 41, 771 (1964), 42, 195 (1965).

The mercury arsenide halides $Hg_2AsCl_2$, $Hg_2AsBr_2$, $Hg_3As_2Cl_2$, and $Hg_4As_2Cl_3$ have been reported by H. Puff, Angew. Chem. 74, 659 (1962). H. Puff, R. Skrabs, H. Gotta and P. Blunck, Naturwissenschaften 52, 494 (1965) have reported $HgAsCl$, $Hg_2AsCl_2$, $Hg_2AsBr_2$ $Hg_4As_2Cl_3$, and $Hg_3As_2I_4$.

Reported mercury phosphide halides include $Hg_3PCl_3$ and $Hg_5P_2Br_4$ [P. Lemoult, Compt. Rend. 145, 1175 (1907)], $Hg_3P_2I_2$ [D. Grdenic, S. Scavnicar, and M. Kesler, Arhiv. Za Kemiju 24, 61 (1952)], $Hg_3P_2I_4$ [H. Puff and P. Blunck, Z. Anorg. Allg. Chem. 349, 39 (1967)], and $Hg_2PCl_2$, $Hg_2PBr_2$, and $Hg_3P_2Cl_2$ [H. Puff, Angew. Chem. 74, 659 (1962)].

No cadmium, cadmium-zinc or mercury phosphide halides having the stoichiometry $M_{2-y}Zn_yP_3X$, where M is Cd or Hg, X is Cl, Br, or I, and y is 0–1.2 have been reported.

DESCRIPTION OF THE INVENTION

This invention provides new electrically semiconducting cadmium, cadmium-zinc, and mercury phosphide halides having the formula $M_{2-y}Zn_yP_3X$, wherein:
M is selected from one of Cd and Hg,
X is selected from at least one member of the group consisting of Cl, Br, and I when M is Cd, and from at least one member of the group consisting of Cl and Br when M is Hg, and
y is 0–1.2 when M is Cd and X is Cl, but otherwise is 0.

It is to be understood that the subscript of X is 1 and accordingly that the sum of chlorine, bromine and iodine atoms in the formula never exceeds one.

The phosphide halides of the invention are semiconductors and photoconductors, and their electrical and optical properties may be varied by doping them with ions such as $In^{3+}$, $Cu^{1+}$, $Ag^{1+}$, $Mg^{2+}$, $Mn^{2+}$, $S^{2-}$, $Se^{2-}$, and $Te^{2-}$ in quantities ranging from a few parts per million to about one percent by weight, the exact quantity depending upon solubility relationships and properties desired.

The cadmium and the cadmium-zinc phosphide halides and the mercury phosphide chloride of this invention are isostructural, with monoclinic crystal structure, and the space group C2/c. In contrast, mercury phosphide bromide, $Hg_2P_3Br$, has an orthorhombic crystal structure and the space group Pbcn.

Although $Cd_{2-y}Zn_yP_3X$ compositions, where X and y are as defined, and $Hg_2P_3Cl$ have similar monoclinic crystal structures and space groups, the two do not appear to form solid solutions with each other, possibly because of differences in the covalency of bonding. In addition, the cadmium and the mercury compositions differ in acid stability. The cadmium-containing compositions dissolve in strong acids whereas $Hg_2P_3Cl$ and $Hg_2P_3Br$ are insoluble even in aqua regia.

At least 50 atomic percent of the Cl in $Hg_2P_3Cl$ may be replaced with Br without change in the monoclinic crystal structure of the $Hg_2P_3Cl$, but with increase in unit cell dimensions. Similarly, at least 30 atomic percent of the Br in $Hg_2P_3Br$ may be replaced with Cl without change in the orthorhombic crystal structure of the $Hg_2P_3Br$, but with decrease in unit cell dimensions. Mercury phosphide bromide chlorides of intermediate composition are polyphase and made up of materials with monoclinic and orthorhombic crystal structures.

The cadmium and the cadmium-zinc phosphide halides are obtained by reactions of mixtures of the requisite elements and/or their binary compounds preferably in the approximate ratios required for the stoichiometry $Cd_{2-y}Zn_yP_3X$, wherein X and y are as defined previously. Reaction is effected by heating the mixed reactants for several hours, e.g., for 3–48 hours, at temperatures of 500°–900°C, preferably in evacuated sealed tubes wherein there is maintained a temperature gradient permitting vapor phase transport and crystallization of product in the cooler end. Pressure may range from essentially zero to 3,000 atmospheres or more.

Mercury-containing compositions of the invention, like the cadmium-containing compositions, may be prepared by reaction of mixtures of the requisite elements and/or their binary compounds in, preferably, the approximate ratios required for the stoichiometry $Hg_2P_3X$, where X is selected from at least one of Cl and Br. Reaction is effected by heating the mixed reactants at about 400°–600°C, preferably at 500°C under autogenous pressure, for periods up to about 24 hours and then cooling, usually slowly over a period of about 10–40 hours to 200°–300°C, then at any convenient rate to room temperature.

Reaction is effected in the absence of air, conveniently in initially evacuated, sealed, thick-walled silica tubes. When sealed silica reaction tubes are used, they are usually heated in a vessel pressured to about 100-200 atmospheres with nitrogen. The nitrogen pressure counterbalances any vapor pressure of mercury developed during reaction and prevents rupture of the reaction tube from internally developed pressure. In synthesizing $Hg_2P_3Cl$ it seems necessary to use a large quantity of reactants in a reaction tube of fairly small volume, viz., about 20 grams in a tube of about 8 ml. capacity — see Examples 14 and 20. Presumably a pressure slightly higher than a few atmospheres is needed. This is not required in the preparation of $Hg_2P_3Br$. Reaction tubes are preferably horizontally disposed during reaction to prevent localized settling of mercury vapor and its ensuing unavailability for reaction. The same result may be achieved by agitating during reaction.

Typical reactions involved in preparing compositions of the invention are:

1. $4Cd + 6P + Br_2 \rightarrow 2Cd_2P_3Br$
2. $4Cd + 6P + I_2 \rightarrow 2Cd_2P_3I$
3. $8Cd + 12P + Br_2 + I_2 \rightarrow 4Cd_2P_3Br_{0.5}I_{0.5}$
4. $4Hg + 6P + Br_2 \rightarrow 2Hg_2P_3Br$
5. $6Cd + PCl_3 + 8P \rightarrow 3Cd_2P_3Cl$
6. $60Hg + 9PCl_3 + PBr_3 + 80P \rightarrow 30Hg_2P_3Cl_{0.9}Br_{0.1}$
7. $3_{(2-y)}Cd + 3_yZn + PCl_3 + 8P \rightarrow 3Cd_{2-y}Zn_yP_3Cl$
8. $2Cd + 0.111PCl_3 + 0.111PBr_3 + 0.111PI_3 + 2.667P \rightarrow Cd_2P_3Cl_{0.333}Br_{0.333}I_{0.333}$
9. $6Hg + PBr_3 + 8P \rightarrow 3Hg_2P_3Br$
10. $CdX_2 + 3Cd + 6P \rightarrow 2Cd_2P_3X$
11. $HgBr_2 + 3Hg + 6P \rightarrow 2Hg_2P_3Br$
12. $HgCl + Hg + 3P \rightarrow Hg_2P_3Cl$
13. $4Cd_3P_2 + 3X_2 + 10P \rightarrow 6Cd_2P_3X$
14. $3_{(2-y)}Cd + 3_yZnP_2 + PCl_3 + (8-6_y)P \rightarrow 3Cd_{2-y}Zn_yP_3Cl$
15. $2_{(2-y)}Cd + ZnCl_2 + (_{2y-1})Zn + 6P \rightarrow 2Cd_{2-y}Zn_yP_3Cl$
16. $0.45HgBr_2 + 0.1HgCl + 1.45Hg + 3P \rightarrow Hg_2P_3Br_{0.9}Cl_{0.1}$
17. $10Hg + PBr_5 + 14P \rightarrow 5Hg_2P_3Br$ In equations 7, 14, and 15, $y$ is 0–1.2. In equations 10 and 13, X is selected from at least one of the group consisting of Cl, Br, and I.

Extremely pure reactants are not required. Commercially available grades usually give satisfactory results though purer reactants, in general, give products of higher purity. Binary compounds especially useful in synthesizing cadmium and cadmium-zinc phosphide halides include the phosphides and halides of cadmium and zinc and the halides of phosphorus, notably $CdP_2$, $CdP_4$, $Cd_3P_2$, $ZnP_2$, $CdX_2$, $ZnCl_2$, $PX_3$, and $PX_5$. Binary compounds especially useful in synthesizing mercury phosphide chloride and mercury phosphide bromide include mercury (I), mercury (II), phosphorus (III) and phosphorus (V) halides. Since elementary chlorine and bromine are volatile, it is usually more convenient to employ their compounds rather than the free halogens.

Though reactants are usually employed in the stoichiometric ratio required for the final compositions, this is not essential. Excess reactants, like impurities such as P, Hg, $CdP_4$, $CdX_2$, $ZnP_2$, and $PX_3$, which are sometimes found in the products, may usually be separated manually, by extracting with appropriate solvents, by flotation, or by other known techniques. Since the mercury phosphide halides, $Hg_2P_3Cl$ and $Hg_2P_3Br$, are insoluble and stable in strong acids, they may be freed of excess mercury, phosphorus halides, and elementary phosphorus by washing them with aqua regia.

Nonstoichiometric inorganic compounds are well recognized (see, for example, the Wadsley chapter in Mandelcorn, "Non-Stoichiometric Compounds", Academic Press, New York, 1964, pp. 98–209), and, accordingly, applicant intends that phosphide halides of the invention which agree approximately with the stoichiometric formulas presented herein are to be included within the scope of the appended claims.

Products of the invention may contain dopants to change the number and type of the charge carriers, e.g., to lower activation energy and electrical resistivity. Elementary forms of dopant metals may be added during synthesis to replace small quantities of cadmium or mercury, and sulfur, selenium, or tellurium may be added to replace limited quantities of phosphorus. Dopants may also be added in the form of their phosphides or halides with commensurate reduction in the quantity of phosphorus and/or halide reactant normally employed.

The quantity of dopant added is determined primarily by its solubility in products of the invention and by the properties desired. The quantity incorporated in the crystal lattice may sometimes be increased by rapid cooling after reaction to prevent segregation of dopant. Divalent metals usually enter the crystal lattice in larger quantity than monovalent or trivalent metal dopants.

Products of the invention are conveniently synthesized in tubular silica or Pyrex reaction vessels which are readily available, relatively low in cost, easily sealed, and chemically inert. Reactants are placed in the tubes which are then evacuated and sealed. Tubular reaction vessels are especially useful in the synthesis of cadmium and cadmium-zinc phosphide halides, for in these cases it is preferred to supply heat in such manner that the end of the tube containing the reactants in hotter than the other end. In both the cadmium and the mercury systems, horizontal disposal of the reaction tubes is preferred.

The temperature gradient preferred during the synthesis of cadmium and cadmium-zinc phosphide halides is achieved most easily by placing the end of the tube containing the reactants in the hotter, central portion of a furnace with the other end of the tube near the open end of the furnace. Furnaces equipped with independently controlled temperature zones may also be used.

Usually with a temperature of about 500°–900°C, preferably 550°–750°C in the hotter end and about 150°–350°C in the cooler end, vapor transport takes place in cadmium-containing synthesis systems, and cadmium-containing products of the invention, sometimes accompanied by by-products, form in the cooler end. As shown in Example 5, more than one product of the invention may deposit in the cooler end simultaneously, in which cases the products may be separated manually. Occasionally, as illustrated in Examples 8 and 9, products of the invention form at both ends of the reaction tube.

While it is preferred on grounds of economy and convenience to effect synthesis in vacuo or at moderate pressure, pressures up to 3,000 atmospheres or more may be used. In such case the reactants may be sealed in evacuated heavy-walled Pyrex tubes which are placed in electrically heated metal vessels in which pressure may be generated by application of nitrogen or other gas. A pressure of up to about 200 atmospheres is applied, and the temperature is raised to about 700°C, whereupon the Pyrex tubes soften and transmit subsequently applied pressure to the reaction mixtures. Desired temperature and pressure are maintained for about three hours or more while reaction takes place. Pressure is usually maintained during cooling. Cooling may be rapid if the pressure vessel is suitably equipped.

The time required for reaction is not especially critical and, as might be expected, depends upon temperature and pressure. In sealed, evacuated tubes, with the hot end at about 500°–900°C, reaction and transport of product(s) is usually complete in 24–48 hours or less. At 3000 atmospheres pressure, reaction may be complete in three hours or less.

In sealed, evacuated tubes in which temperature gradients are maintained, $Cd_{2-y}Zn_yP_3X$ compositions, sometimes accompanied by by-products, usually form in the cooler end of the tubes as polycrystalline masses or films, frequently containing single crystals up to about 1 mm in size. Single crystals of the mercury phosphide halides may also be obtained.

Cadmium phosphide halides, cadmium-zinc phosphide chloride, and mercury phosphide chloride are isostructural with monoclinic unit cells, space group $C2/c$, and unit cell dimensions of:

| Composition | a(A) | b(A) | c(A) | β |
|---|---|---|---|---|
| $Cd_2P_3Cl$ | 7.9885±0.0006 | 8.9878±0.0006 | 7.5552±0.0006 | 100.9° |
| $Cd_2P_3Br$ | 8.089±0.001 | 9.089 ±0.001 | 7.535 ±0.001 | 100.4° |
| $Cd_2P_3I$ | 8.244±0.001 | 9.293 ±0.001 | 7.505 ±0.001 | 99.64 ± 0.06° |
| $Hg_2P_3Cl$ | 7.840±0.001 | 8.849 ±0.001 | 7.593 ±0.001 | 98.63 |

Mercury phosphide bromide, $Hg_2P_3Br$, has an orthorhombic space lattice with space group Pbcn and cell dimensions of: $a = 8.014A.$, $b = 8.901A.$, and $c = 7.822A.$ In contrast to known $Cd_4P_2X_3$ compounds, which react and dissolve in 6N hydrochloric acid, the cadmium phosphide halides and the cadmium-zinc phosphide chlorides of the present invention are not visibly attacked by 6N hydrochloric acid. They react and partially dissolve in 12N hydrochloric acid, however, leaving residues that consist largely of orange, flake-like, amorphous material that appears to be elemental phosphorus.

The semiconductive and photoconductive characteristics of the phosphide halides of this invention make them useful in a variety of applications. All are semiconductors. For example, electrical resistivities and activation energies found for compositions described in the examples were:

| | $\rho 298°K$ in Ohm-Cm | $E_a$ in Electron Volts |
|---|---|---|
| $Cd_2P_3Cl$ | $4 \times 10^7$ | 0.6 |
| $Cd_2P_3Br$ | $\sim 10^5$ | 0.7 |
| $Cd_2P_3I$ | $\sim 10^7$ | 0.2 |
| $Hg_2P_3Cl$ | $6.89 \times 10^8$ | — |
| $Hg_2P_3Br$ | $6.00 \times 10^7$ | 0.67 |
| $Hg_2P_3Br_{0.7}Cl_{0.3}$ | 8 | 0.22 |
| $Hg_2P_3Br_{0.9}Cl_{0.1}$ | $1 \times 10^{-1}$ | — |

It will be noted that the resistivity of compositions intermediate between $Hg_2P_3Br$ and $Hg_2P_3Cl$ is markedly lower than that of the end members. The compositions of the invention may be used in semiconductor devices such as thermistors, thermoelectrics, rectifiers, and detectors for visible and infrared light.

$Cd_2P_3Cl$ is more photoconductive than the corresponding bromide or iodide, and $Hg_2P_3Cl$ is more photoconductive than $Hg_2P_3Br$:

| | Ratio of Resistance in Dark to Resistance in Light |
|---|---|
| $Cd_2P_3Cl$ | 70 |
| $Cd_2P_3Br$ | 1.5 |
| $Cd_2P_3I$ | ~5 |
| $Hg_2P_3Cl$ | 125 |
| $Hg_2P_3Br$ | 40 |

Cadmium phosphide chloride, $Cd_2P_3Cl$, is thermochromic, changing from light orange at 77°K to black at 573°K. This effect is useful in modulating the wavelength of transmitted light since the wavelength of transmitted light is a function of the temperature of the thermochromic material. Thus, when the temperature of the thermochromic material is varied in known manner, e.g., by simple electrical heating and cooling by contact with a thermoelectric element which cools when current is passed in one direction and heats when current is passed in the other direction, the wavelength of transmitted light is reproducibly changed as the current is altered in magnitude or direction.

SPECIFIC EMBODIMENTS OF THE INVENTION

The following nonlimitative examples describe the practice of the invention. All parts are by weight unless otherwise indicated.

EXAMPLES 1-10

Reactions summarized in Table I were carried out in silica tubes which were evacuated and sealed after placing the indicated quantities of reactants therein. The tubes were approximately 7 to 8 inches in length with an internal diameter of about 10 mm and were horizontally disposed in an electric furnace in such manner that the end containing the reactants was heated to a higher temperature than the other end, thus permitting vapor phase transfer and deposition of product in the cooler end. The time of heating was approximately 48 hours. Impurities and multiphase products were separated manually.

TABLE I

Examples 1-10

| Ex. No. | Reactants | | | Temperature, °C | | Identity of product(s) | Cell dimensions | | | |
|---|---|---|---|---|---|---|---|---|---|---|
| | Quantity used | Formula ratio in which used | | Hot end | Cooler end | | a, A. | b, A. | c, A. | β° |
| 1 | 1.124 g. Cd, 0.16 ml. PCl₃, 0.4646 g. P | Cd:PCl₃:P = 2:0.36:3 | | 740 | 340 | Cd₂P₃Cl (1) | 7.9885±0.0006 | 8.9878±0.0006 | 7.5552±0.0006 | 100.9 |
| 2 | 1.124 g. Cd, 0.17 ml. PBr₃, 0.42 g. P | Cd:PBr₃:P = 2:0.35:2.7 | | 558 | 200 | Cd₂P₃Br (2) | 8.089±0.001 | 9.089±0.001 | 7.535±0.001 | 100.36 |
| 3 | 1.124 g. Cd, 0.16 ml. PBr₃, 0.4646 g. P | Cd:PBr₃:P = 2:0.34:3 | | 740 | 320 | Cd₂P₃Br (3) | | | | |
| 4 | 1.124 g. Cd, 0.465 g. P, 0.64 g. I | Cd:P:I = 2:3:1 | | 700 | 300 | Cd₂P₃I (4) | 8.244±0.001 | 9.293±0.001 | 7.505±0.001 | 99.64±0.06 |
| 5 | 0.5620 g. Cd, 0.3268 g. Zn, 0.16 ml. PCl₃, 0.4646 g. P | Cd:Zn:PCl₃:P = 1:1:0.36:3 | | 700 | 300 | Orange Cd₀.₈₄Zn₁.₁₆P₃Cl (5) and Red Cd₁.₅₄Zn₀.₄₆P₃Cl | 7.792±0.002 8.877±0.003 | 8.956±0.002 | 7.455±0.003 7.525±0.002 | 100.66 100.8 |
| 6 | 1.124 g. Cd, 0.08 ml. PCl₃, 0.4646 g. P, 0.320 g. I | Cd:PCl₃:P:I = 2:0.18:3:0.5 | | 700 | 303 | Cd₂P₃Cl₀.₇₁I₀.₂₆ (6) | 7.934±0.002 | 9.048±0.002 | 7.544±0.002 | 100.50 |
| 7 | 1.124 g. Cd, 0.4646 g. P, 0.08 ml. PBr₃, 0.05 ml. PCl₃ | Cd:PCl₃:PBr₃:P = 2:0.18:0.17:3 | | 760 | 303 | Cd₂P₃Cl₀.₅₈Br₀.₄₂ (7) | 8.044±0.001 | 9.036±0.002 | 7.532±0.002 | 100.5 |
| 8 | 1.124 g. Cd, 0.08 ml. PBr₃, 0.465 g. P, 0.320 g. I | Cd:PBr₃:P:I = 2:0.17:3:0.5 | | 650 | 160 | {In cooler zone: Cd₂P₃Br₀.₅₉I₀.₄₁ (8); In hot zone: Cd₂P₃Br₀.₈₃I₀.₁₇} | 8.151±0.001 8.116±0.002 | 9.177±0.002 9.135±0.002 | 7.528±0.002 7.518±0.002 | 100.2 100.22 |
| 9 | 1.124 g. Cd, 0.05 ml. PCl₃, 0.05 ml. PBr₃, 0.465 g. P, 0.213 g. I | Cd:PCl₃:PBr₃:P:I = 2:0.11:0.105:3:0.34 | | 650 | 160 | In cooler zone (9) | 8.061±0.002 | 9.080±0.002 | 7.531±0.002 | 100.43 |
| 10 | 0.9554 g. Cd, 0.098 g. Zn, 0.16 ml. PCl₃, 0.415 g. P | Cd:Zn:PCl₃:P = 2:0.25:0.46:3.35 | | 878 | 410 | Cd₁.₈₄Zn₀.₁₆P₃Cl (10) | 8.066±0.003 | 9.070±0.002 | 7.534±0.002 | 100.59 |

FOOTNOTES FOR TABLE I (1) The product formed as red polycrystalline film and large single crystals in the cooler end of the tube along with P, black crystalline CdP₄ and clear crystals of CdCl₂. The P, CdP₄, and CdCl₂ were separated manually. The Debye-Scherrer x-ray pattern of the product is given in Table II. Anal. Calcd. for Cd₂P₃Cl: Cd, 63.65; P, 26.30; Cl, 10.04. Found: Cd, 62.7; P, 26.16; Cl, 10.34. Density by displacement in bromoform was 4.31 g/cm³ compared to 4.46 g/cm³ calculated for four formula units of Cd₂P₃Cl per unit cell. The space group was C2/c. Crystal structure by single crystal technique confirmed the composition. Resistivity measurements on a crystal showed semiconductivity: $\rho 298°K = 4 \times 10^7$ ohm-cm, activation energy, $E_a = 0.6$ eV. Ratio of resistance in the dark to resistance in light was 70. The product reacted with concentrated hydrochloric acid, evolving a gas and forming an orange, flaky amorphous material that, by analysis, consisted pricipally of phosphorus.

(2) The charge was completely transported to the cooler zone and consisted of polycrystalline brownish-red Cd₂P₃Br plus traces of orange material which were separated manually. Guinier camera data were indexed on the basis of a cell analogous to that of Cd₂P₃Cl but larger in size. Debye-Scherrer x-ray data are reported in Table III.

(3) Charge was completely transported to cooler end and consisted principally of reddish-brown crystals which gave a Debye-Scherrer x-ray pattern similar to the product of Example 2. Anal. Calcd. for Cd₂P₃Br: Cd, 56.51; P, 23.36; Br, 20.13. Found: Cd, 56.11; P, 22.80; Br, 20.65. Resistivity and activation energy measured on a single crystal were $\rho 298°K \approx 10^5$ ohm-cm.; $E_a = 0.7$ eV; ratio resistance in the dark to resistance in visible light ≈ 1.5.

(4) Charge was completely transported to cooler end and consisted of a top layer of CdP₄ and a lower layer of Cd₂P₃I. The Debye-Scherrer pattern of the Cd₂P₃I (see Table IV) resembled that of Cd₂P₃Cl and Cd₂P₃Br but was shifted to a larger cell. Resistivity measurements on a polycrystalline chip showed $\rho 298°K \approx 10^7$ ohm-cm., $E_a = 0.2$ eV, and a small degree of photoconductivity (ratio of $R_{dark}/R_{light} \approx 5$).

(5) Entire charge was transported to the cooler end, giving a mixture of black Cd-substituted ZnP₂ plus orange and red crystals that gave X-ray patterns of Cd₂P₃Cl-type but with cell sizes shifted in a manner that indicated Zn substitution in the crystal lattice. The cell volume of the orange crystals was 506.7A.³ as compared to 532.6A.³ for Cd₂P₃Cl; analysis by atomic absorption spectroscopy indicated formula to be Cd₀.₈₄Zn₁.₁₆P₃Cl. Analysis by atomic absorption spectroscopy indicated that the formula of the red material was Cd₁.₅₄Zn₀.₄₆P₃Cl; its cell volume was 525.3A³.

(6) Large dark-red crystals deposited in the cooler end were shown by unit cell dimensions to be a quaternary compound. Unit cell volume was 540A³. On the basis of Vegard's rule, the cell dimensions corresponded to Cd₂P₃Cl₀.₇₄I₀.₂₆.

(7) Reddish crystals deposited in the cooler zone. The crystals gave a single-phase x-ray diffraction pattern with cell dimensions intermediate between those of Cd₂P₃Cl and Cd₂P₃Br, thus indicating formation of a quaternary phase. Unit cell volume was 537.8A.³, which on the basis of Vegard's rule and cell dimensions corresponded to a formula of Cd₂P₃Cl0.58Br₀.₄₂.

(8) Brownish-black materials from both the hot and the cooler ends gave Cd₂P₃Cl-type x-ray diffraction powder patterns indicating that both were single-phase compositions of monoclinic structural type. The products possessed cell volumes intermediate between those of Cd₂P₃Br and Cd₂P₃I proving that both were quaternary compositions. Material deposited in the cooler end had a cell volume of 554.3A.³ and by Vegard's rule a formula of Cd₂P₃Br₀.₅₉I₀.₄₁. That formed in the hot end had a cell volume of 548.6A.³ and by Vegard's rule a composition of Cd₂P₃ Br₀.₈₃I₀.₁₇.

(9) Part of the charge remained in the hot zone and part was transported. Products in both ends were single-phase. X-ray diffraction patterns and cell volumes corresponded to materials of Cd₂P₃Cl-type, that is, to 5-element crystals corresponding to CdP₂Cl$_a$Br$_b$I$_c$ where where $a + b + c = 1$. Reactants were used in the proper ratio to give Cd₂P₃Cl₀.₃₃Br₀.₃₃I₀.₃₃. Cell volumes were 541.7A.³ and 542.09A.³, respectively, for materials from the hot zone and the cooler zone.

(10) Almost the entire charge was transported to cooler end of reaction tube as black crystals of ZnP₂ and red crystals of Cd₂P₃Cl crystal-type with, however, a smaller cell. Analysis by atomic absorption spectroscopy showed 3.0% Zn and 62.4% Cd which corresponds to the composition Cd₁.₈₄Zn₀.₁₃₅P₃Cl.

TABLE II

Debye-Scherrer X-Ray Pattern of Powder of $Cd_2P_3Cl$ of Ex. 1

| I | h | k | l | d(obs) | d(calc) |
|---|---|---|---|--------|---------|
| 20 | -1 | 1 | 0 | 5.91389 | 5.90988 |
| 10 | -1 | 1 | 1 | 4.98589 | 4.98164 |
| 10 | 0 | 2 | 0 | 4.49592 | 4.49390 |
| 10 | 1 | 1 | 1 | 4.33111 | 4.33121 |
| 50 | -2 | 0 | 0 | 3.92237 | 3.92205 |
| 75 | 0 | 2 | 1 | 3.84483 | 3.84370 |
| 80 | 0 | 0 | 2 | 3.71124 | 3.70934 |
| 2 | -1 | 1 | 2 | 3.36280 | 3.36529 |
| 15 | -2 | 0 | 2 | 2.99256 | 2.99255 |
| 45 | 1 | 1 | 2 | 2.95806 | 2.95758 |
| 100 | -2 | 2 | 1 | 2.89115 | 2.89056 |
| 45 | 0 | 2 | 2 | 2.86155 | 2.86070 |
| 2 | -1 | 3 | 0 | 2.79934 | 2.79875 |
| 70 | 2 | 2 | 1 | 2.62030 | 2.61975 |
| 5 | 1 | 3 | 1 | 2.56311 | 2.56208 |
| 10 | -3 | 1 | 1 | 2.52087 | 2.52135 |
| 5 | -3 | 1 | 0 | 2.50994 | 2.51062 |
| 5 | -2 | 2 | 2 | 2.48955 | 2.49082 |
| 20 | 2 | 0 | 2 | 2.47184 | 2.47151 |
| 25 | -1 | 1 | 3 | 2.40670 | 2.40673 |
| 20 | -1 | 3 | 2 | 2.31063 | 2.31043 |
| 20 | 0 | 4 | 0 | 2.24694 | 2.24695 |
| 20 | 1 | 1 | 3 | 2.17307 | 2.17353 |
| 20 | 0 | 2 | 3 | 2.16668 | 2.16654 |
| 10 | 0 | 4 | 1 | 2.15035 | 2.15048 |
| 25 | 2 | 2 | 3 | 2.04552 | 2.04553 |
| 15 | -4 | 0 | 0 | 1.96068 | 1.96103 |
| 30 | -2 | 4 | 0 | 1.94891 | 1.94966 |
| 10 | -2 | 4 | 1 | 1.93025 | 1.93082 |
| 30 | 0 | 4 | 2 | 1.92174 | 1.92185 |
| 25 | -4 | 0 | 2 | 1.88734 | 1.88757 |
| 30 | -3 | 3 | 2 | 1.85363 | 1.85272 |
| 30 | 2 | 4 | 1 | 1.84361 | 1.84347 |
| 20 | -4 | 2 | 1 | 1.82014 | 1.82059 |
| 20 | -4 | 2 | 0 | 1.79721 | 1.79735 |
| 25 | 2 | 2 | 3 | 1.77606 | 1.77587 |
| 2 | -1 | 5 | 0 | 1.75211 | 1.75214 |
| 10 | -1 | 5 | 1 | 1.72156 | 1.72159 |
| 2 | 1 | 1 | 4 | 1.70297 | 1.70415 |
| 10 | 4 | 2 | 1 | 1.68157 | 1.68134 |
| 2 | 1 | 1 | 4 | 1.70297 | 1.70314 |
| 10 | 4 | 2 | 1 | 1.68157 | 1.68134 |
| 5 | 0 | 4 | 3 | 1.66343 | 1.66299 |
| 10 | -3 | 1 | 4 | 1.64121 | 1.64112 |
| 15 | 4 | 0 | 2 | 1.61206 | 1.61215 |
| 10 | -2 | 4 | 3 | 1.60628 | 1.60630 |
| 10 | 1 | 3 | 4 | 1.59684 | 1.59702 |
| 2 | -5 | 1 | 2 | 1.53100 | 1.53158 |
| 10 | 1 | 3 | 4 | 1.49926 | 1.50007 |
| 10 | -1 | 1 | 5 | 1.49007 | 1.49014 |
| 15 | -4 | 4 | 0 | 1.47776 | 1.47747 |
| 2 | 0 | 6 | 1 | 1.46821 | 1.46833 |

TABLE III

Debye-Scherrer X-Ray Pattern of Powder of $Cd_2P_3Br$ of Ex. 2.

| I | h | k | l | d(obs) | d(calc) |
|---|---|---|---|--------|---------|
| 15 | -1 | 1 | 1 | 4.99811 | 4.99326 |
| 2 | 0 | 2 | 0 | 4.56365 | 4.54388 |
| 15 | -2 | 0 | 0 | 3.97939 | 3.97088 |
| 30 | 0 | 2 | 1 | 3.87248 | 3.87126 |
| 70 | 0 | 0 | 2 | 3.69942 | 3.69686 |
| 45 | 1 | 1 | 2 | 2.97268 | 2.96918 |
| 100 | -2 | 2 | 1 | 2.91123 | 2.91296 |
| 25 | 0 | 2 | 2 | 2.86617 | 2.86765 |
| 2 | -1 | 3 | 1 | 2.69836 | 2.70196 |
| 60 | 2 | 2 | 1 | 2.64954 | 2.64960 |
| 5 | 1 | 3 | 1 | 2.59087 | 2.58829 |
| 5 | -3 | 1 | 0 | 2.54076 | 2.54161 |
| 5 | 2 | 0 | 2 | 2.49198 | 2.49081 |
| 15 | -1 | 1 | 3 | 2.39701 | 2.39627 |
| 5 | -1 | 3 | 2 | 2.31968 | 2.32054 |
| 15 | 0 | 4 | 0 | 2.27192 | 2.27194 |
| 15 | 0 | 4 | 1 | 2.17286 | 2.17173 |
| 25 | -2 | 2 | 3 | 2.04287 | 2.04295 |
| 15 | -4 | 0 | 0 | 1.98334 | 1.98544 |
| 25 | 0 | 4 | 2 | 1.93502 | 1.93563 |
| 20 | -4 | 0 | 2 | 1.89810 | 1.89775 |
| 25 | 3 | 3 | 1 | 1.86108 | 1.86207 |
| 10 | 0 | 0 | 4 | 1.84570 | 1.84843 |
| 15 | 2 | 2 | 3 | 1.78737 | 1.78636 |
| 5 | -1 | 5 | 1 | 1.73727 | 1.73891 |
| 2 | -4 | 0 | 3 | 1.70328 | 1.70365 |
| 15 | 3 | 1 | 3 | 1.63413 | 1.63350 |
| 5 | -5 | 0 | 1 | 1.61312 | 1.61389 |
| 2 | -1 | 3 | 4 | 1.59549 | 1.59532 |
| 2 | 1 | 5 | 2 | 1.57315 | 1.57323 |
| 5 | -4 | 4 | 1 | 1.50541 | 1.50565 |
| 15 | -4 | 4 | 0 | 1.49535 | 1.49501 |
| 5 | -1 | 6 | 0 | 1.48781 | 1.48781 |
| 10 | -2 | 1 | 5 | 1.45656 | 1.45654 |
| 2 | 0 | 4 | 4 | 1.43387 | 1.43383 |
| 2 | -2 | 6 | 0 | 1.41541 | 1.41517 |
| 5 | -2 | 2 | 5 | 1.40439 | 1.40346 |
| 2 | -3 | 1 | 5 | 1.38784 | 1.38689 |
| 5 | 2 | 6 | 1 | 1.37343 | 1.37372 |
| 5 | -6 | 0 | 2 | 1.32435 | 1.32433 |
| 5 | -4 | 1 | 5 | 1.29075 | 1.29084 |
| 5 | -2 | 6 | 3 | 1.26317 | 1.26283 |
| 5 | 5 | 3 | 2 | 1.24955 | 1.25000 |
| 10 | -6 | 2 | 3 | 1.21899 | 1.21880 |
| 5 | -1 | 5 | 5 | 1.15849 | 1.15846 |
| 5 | -5 | 5 | 3 | 1.13846 | 1.13850 |
| 2 | -3 | 6 | 4 | 1.11975 | 1.11978 |

TABLE IV

Debye-Scherrer X-Ray Pattern of Powder of $Cd_2P_3I$ of Ex. 4.

| I | h | K | l | d(obs) | d(calc) |
|---|---|---|---|--------|---------|
| 5 | -1 | 1 | 1 | 5.04607 | 5.03905 |
| 2 | -1 | 2 | 0 | 4.07950 | 4.06484 |
| 2 | 0 | 2 | 1 | 3.93935 | 3.97223 |
| 45 | -1 | 2 | 1 | 3.70018 | 3.69728 |
| 5 | 1 | 2 | 1 | 3.44319 | 3.43833 |
| 10 | 2 | 0 | 1 | 3.28789 | 3.30127 |
| 30 | 0 | 3 | 0 | 3.14798 | 3.14171 |
| 100 | -2 | 2 | 1 | 2.96113 | 2.96282 |
| 2 | 0 | 2 | 2 | 2.89834 | 2.90591 |
| 55 | 2 | 2 | 1 | 2.70787 | 2.70384 |
| 2 | -1 | 0 | 3 | 2.47176 | 2.47324 |
| 10 | 0 | 3 | 2 | 2.39455 | 2.39245 |
| 20 | 3 | 1 | 1 | 2.31882 | 2.31746 |
| 5 | 1 | 0 | 3 | 2.25042 | 2.24857 |
| 10 | -3 | 2 | 2 | 2.12053 | 2.11495 |
| 20 | -2 | 2 | 3 | 2.04814 | 2.05049 |
| 20 | -2 | 4 | 0 | 2.03221 | 2.03242 |
| 5 | -3 | 0 | 3 | 1.98808 | 1.98761 |
| 20 | 3 | 1 | 2 | 1.96728 | 1.96724 |
| 10 | 0 | 3 | 3 | 1.93114 | 1.93727 |
| 15 | 2 | 4 | 1 | 1.92247 | 1.91787 |
| 10 | -4 | 0 | 2 | 1.90596 | 1.90500 |
| 5 | 4 | 0 | 1 | 1.85521 | 1.85980 |
| 10 | 1 | 3 | 3 | 1.82990 | 1.82850 |
| 10 | 0 | 1 | 4 | 1.81458 | 1.81120 |
| 10 | -1 | 5 | 2 | 1.66810 | 1.66926 |
| 5 | 2 | 5 | 1 | 1.63694 | 1.63696 |
| 2 | -5 | 1 | 1 | 1.60438 | 1.60466 |
| 15 | 3 | 4 | 2 | 1.53046 | 1.52988 |
| 5 | -4 | 4 | 2 | 1.48236 | 1.48141 |
| 5 | -2 | 2 | 5 | 1.40421 | 1.40228 |
| 2 | -3 | 6 | 1 | 1.35406 | 1.35346 |
| 5 | 0 | 5 | 4 | 1.31810 | 1.31875 |
| 5 | -1 | 0 | 6 | 1.24858 | 1.24830 |
| 5 | -2 | 0 | 6 | 1.23652 | 1.23662 |

In Tables II, III, and IV and throughout this specification, I is the relative intensity of the X-ray diffraction line arbitrarily assigning an intensity value of 100 to the strongest line. The columns headed h, k and l list the Miller indices. The observed and calculated interplanar spacings, d(obs) and d(calc), between planes in the unit cell defined by Miller indices are given in Angstroms.

EXAMPLE 11

This example illustrates the preparation of $Cd_2P_3Br$ at high pressure. A mixture of 1.124 g. of cadmium, 0.16 ml. of $PBr_3$, and 0.4646 g. of phosphorus was ground together and sealed in 10 mm. outside diameter by 6 mm. inside diameter Pyrex tubing. The tube and contents were cold-pressured to 200 atmospheres with argon and heated to 700°C., a temperature at which the Pyrex tube softened sufficiently to transmit pressure, further pressured to 3,000 atmospheres with argon, held at 700°C./3,000 atm. for 5 hours, then cooled to room temperature in 2 to 3 hours. The homogeneous, purplish, microcrystalline product gave a Debye-Scherrer pattern identical to that reported in Table III for $Cd_2P_3Br$.

EXAMPLE 12

This example illustrates the preparation of indium-doped cadmium phosphide chloride. A mixture of 1.011 g. cadmium, 0.115 g. indium, 0.16 ml. phosphorus trichloride, and 0.4646 g. phosphorus was sealed in vacuo in a silica tube. The tube was heated in a surrounding electric furnace for 48 hours with the end containing the reactants at 600°C. and the other end at 300°C. Material transported to the cooler end consisted principally of a red crystalline phase. This red phase gave a Debye-Scherrer X-ray diffraction pattern of $Cd_2P_3Cl$-type with, however, slight shifting of cell constants indicating substitution of indium in the cell lattice. This was confirmed by the resistivity and activation energy of a crystal of the material:

| | $\rho$298°K. in Ohm-Cm. | Activation Energy in eV |
|---|---|---|
| Undoped $Cd_2P_3Cl$ | $4 \times 10^7$ | 0.6 |
| Indium-doped $Cd_2P_3Cl$ | $3 \times 10^4$ | 0.3 |

EXAMPLE 13

This example illustrates the doping of $Cd_2P_3Cl$ with copper. A mixture of 1.0116 g. cadmium, 0.0633 g. copper, 0.16 ml. phosphorus trichloride, and 0.4646 g. phosphorus was sealed in vacuo in a silica tube and heated in a tube furnace for about 48 hours with the end of the tube containing the reactants at 700°C. and the other end of the tube at 300°C. Red crystalline copper-doped cadmium phosphide chloride that formed in the cooler region of the tube gave a Debye-Scherrer X-ray diffraction pattern similar to that of $Cd_2P_3Cl$ but, as a result of the doping with copper, the somewhat different resistivity and activation energy of $\rho$298°K. $= 10^6$ ohm-cm. and $E_a = 0.5$ eV respectively.

EXAMPLE 14

$Hg_2P_3Cl$ was obtained in an experiment in which a mixture of HgCl (18.7531 g), P (1.2181 g), and Ge (0.0288 g) was sealed in vacuo in a thick-walled (2 mm) silica tube of about 8 ml capacity and heated for 2 hours at 500°C. in a metal vessel pressured to 150 atmospheres with nitrogen to prevent rupture of the silica tube. Temperature was then lowered to 300°C. over a 40-hour period and finally to room temperature. The multi-phase product was washed with aqua regia leaving, among other phases, black shining crystals found by analysis and x-ray methods to be $Hg_2P_3Cl$. Calcd.: Cl, 6.69; P, 17.54. Found: Cl, 6.69; P, 17.11. Germanium was not detected by emission spectroscopy sensitive to 2 ppm. Cell dimensions and space group were determined by Buerger precession camera technique. Crystal structure was monoclinic and similar to that of $Cd_2P_3Cl$. Cell dimensions were: $a = 7.840$A., $b = 8.849$A., $c = 7.593$A., $\beta = 98.63°$. The space group was C2/c. The crystals were semiconducting, with a resistivity, $\rho$, of $6.89 \times 10^8$ ohm-cm, and photoconducting with a ratio of resistance in the dark to that in light of 125. The Debye-Scherrer powder diffraction pattern of the $Hg_2P_3Cl$ is reported in Table V.

TABLE V

X-RAY POWDER DIFFRACTION PATTERN OF $Hg_2P_3Cl$

| I | h | k | l | d(obs) | d(calc) |
|---|---|---|---|--------|---------|
| 60 | −1 | 1 | 1 | 4.8754 | 4.8793 |
| 80 | 1 | 1 | 1 | 4.3693 | 4.3719 |
| 85 | 2 | 0 | 0 | 3.8748 | 3.8756 |
| 90 | 0 | 2 | 1 | 3.8125 | 3.8115 |
| 75 | 0 | 0 | 2 | 3.7522 | 3.7535 |
| 70 | −1 | 1 | 2 | 3.3316 | 3.3319 |
| 100 | 1 | 1 | 2 | 3.0057 | 3.0054 |
| 65 | −2 | 0 | 2 | 2.9237 | 2.9245 |
| 45 | 0 | 2 | 2 | 2.8621 | 2.8622 |
| 100 | −2 | 2 | 1 | 2.8288 | 2.8274 |
| 10 | 1 | 3 | 0 | 2.7564 | 2.7566 |
| 30 | −1 | 3 | 1 | 2.6314 | 2.6336 |
| 85 | 2 | 2 | 1 | 2.6198 | 2.6196 |
| 10 | 1 | 3 | 1 | 2.5438 | 2.5441 |
| 10 | 2 | 0 | 2 | 2.5144 | 2.5142 |
| 5 | 3 | 1 | 0 | 2.4798 | 2.4801 |
| 5 | −3 | 1 | 1 | 2.4629 | 2.4630 |
| 85 | −1 | 1 | 3 | 2.4000 | 2.3998 |
| 80 | −1 | 3 | 2 | 2.2809 | 2.2806 |
| 65 | 3 | 1 | 1 | 2.2598 | 2.2600 |
| 95 | 0 | 4 | 0 | 2.2116 | 2.2121 |
| 70 | 1 | 3 | 2 | 2.1678 | 2.1673 |
| 10 | 0 | 4 | 1 | 2.1223 | 2.1219 |
| 35 | −2 | 2 | 3 | 2.0146 | 2.0145 |
| 60 | 3 | 1 | 2 | 1.9442 | 1.9444 |
| 50 | 4 | 0 | 0 | 1.9379 | 1.9378 |
| 80 | 2 | 4 | 0 | 1.9214 | 1.9212 |
| 90 | −1 | 3 | 3 | 1.9048 | 1.9041 |
| 60 | −1 | 1 | 4 | 1.8486 | 1.8483 |
| 75 | −4 | 0 | 2 | 1.8380 | 1.8379 |
| 65 | 3 | 3 | 1 | 1.8319 | 1.8319 |
| 50 | 2 | 4 | 1 | 1.8296 | 1.8288 |
| 40 | −3 | 3 | 2 | 1.8116 | 1.8114 |
| 30 | 1 | 3 | 3 | 1.8058 | 1.8055 |
| 65 | −4 | 2 | 1 | 1.7833 | 1.7831 |
| 20 | 4 | 2 | 0 | 1.7753 | 1.7750 |
| 55 | −2 | 4 | 2 | 1.7646 | 1.7642 |
| 20 | 1 | 1 | 4 | 1.7306 | 1.7304 |
| 10 | 1 | 5 | 0 | 1.7257 | 1.7253 |
| 20 | −1 | 5 | 1 | 1.6941 | 1.6938 |
| 10 | 4 | 2 | 1 | 1.6767 | 1.6765 |
| 25 | 1 | 5 | 1 | 1.6695 | 1.6693 |
| 45 | 3 | 3 | 2 | 1.6516 | 1.6514 |
| 30 | 3 | 1 | 3 | 1.6472 | 1.6469 |
| | −3 | 3 | 3 | 1.6264 | 151.6264 |
| 50 | −3 | 1 | 4 | 1.6127 | 1.6125 |
| 30 | 2 | 0 | 4 | 1.5977 | 1.5977 |
| 45 | −1 | 3 | 4 | 1.5915 | 1.5913 |
| 10 | −2 | 4 | 3 | 1.5818 | 1.5817 |
| 20 | −4 | 2 | 3 | 1.5520 | 1.5519 |
| 20 | 1 | 5 | 2 | 1.5485 | 1.5481 |

EXAMPLE 15

This example illustrates the preparation of $Hg_2P_3Br$. A mixture of mercury (1.2179 g, 0.00607 g atom), mercuric bromide (0.7249 g, 0.002011 mole), and phosphorus (0.3761 g, 0.01214 g atom) was sealed in vacuo in a heavy-walled silica tube, placed in a pressure vessel to which 200 atmospheres back-up nitrogen pressure was applied, and heated to 500°C. Temperature was then gradually lowered to 300°C over a 30-hour period and finally to room temperature. The product consisted principally of black, intergrown crystalline filmlike material and a small amount of mercury. The mercury was extracted with aqua regia. The undissolved material corresponded to $Hg_2P_3Br$ in analysis. Calcd. for $Hg_2P_3Br$: Br, 13.92; P, 16.18. Found: Br, 13.25; P. 17.22. Its Debye-Scherrer x-ray pattern is reported in Table VI. By Buerger precession camera technique, the crystal structure of the $Hg_2P_3Br$ was orthorhombic with space group Pbcn and cell constants of $a = 8.014A.$, $b = 8.901A.$, and $c = 7.822A$. It was semiconducting with a resistivity of $6 \times 10^7$ ohm-cm, and an activation energy, $E_a$, of 0.67 eV. The composition was photoconductive with a ratio of resistance in the dark to that in light of 40.

TABLE VI

X-RAY POWDER DIFFRACTION PATTERN OF $Hg_2P_3Br$

| I | h | k | l | $d_{(obs)}$ | $d_{(calc)}$ |
|---|---|---|---|---|---|
| 20 | 1 | 1 | 0 | 5.9493 | 5.9556 |
| 10 | 1 | 1 | 1 | 4.7344 | 4.7384 |
| 70 | 0 | 2 | 0 | 4.4488 | 4.4504 |
| 80 | 2 | 0 | 0 | 4.0056 | 4.0069 |
| 45 | 0 | 2 | 1 | 3.8663 | 3.8681 |
| 95 | 1 | 0 | 2 | 3.5151 | 3.5147 |
| 95 | 1 | 2 | 1 | 3.4839 | 3.4835 |
| 70 | 2 | 1 | 1 | 3.3096 | 3.3104 |
| 40 | 1 | 1 | 2 | 3.2681 | 3.2690 |
| 75 | 2 | 2 | 0 | 2.9773 | 2.9778 |
| 80 | 2 | 0 | 2 | 2.7980 | 2.7987 |
| 100 | 2 | 2 | 1 | 2.7833 | 2.7829 |
|  | 1 | 3 | 0 |  | 2.7823 |
| 95 | 1 | 2 | 2 | 2.7584 | 2.7582 |
| 65 | 2 | 1 | 2 | 2.6698 | 2.6699 |
| 25 | 1 | 3 | 1 | 2.6213 | 2.6214 |
| 60 | 3 | 1 | 1 | 2.4314 | 2.4317 |
| 35 | 1 | 1 | 3 | 2.3882 | 2.3884 |
| 15 | 2 | 2 | 2 | 2.3691 | 2.3692 |
| 95 | 0 | 2 | 3 | 2.2496 | 2.2496 |
| 90 | 3 | 0 | 2 | 2.2060 | 2.2058 |
| 75 | 3 | 2 | 1 | 2.1982 | 2.1980 |
| 60 | 1 | 2 | 3 | 2.1659 | 2.1659 |
| 60 | 0 | 4 | 1 | 2.1405 | 2.1402 |
|  | 3 | 1 | 2 |  | 2.1410 |
| 15 | 2 | 1 | 3 | 2.1224 | 2.1223 |
| 75 | 1 | 4 | 1 | 2.0679 | 2.0678 |
| 25 | 2 | 3 | 2 | 2.0359 | 2.0359 |
| 40 | 4 | 0 | 0 | 2.0034 | 2.0034 |
| 50 | 3 | 3 | 0 | 1.9852 | 1.9852 |
| 35 | 3 | 2 | 2 | 1.9766 | 1.9764 |
| 45 | 2 | 2 | 3 | 1.9616 | 1.9616 |
| 35 | 0 | 0 | 4 | 1.9558 | 1.9554 |
| 5 | 2 | 4 | 0 | 1.9454 | 1.9453 |
| 5 | 0 | 4 | 2 | 1.9340 | 1.9340 |
| 10 | 3 | 3 | 1 | 1.9242 | 1.9242 |
| 20 | 1 | 3 | 3 | 1.9019 | 1.9025 |
|  | 1 | 0 | 4 | 1.8997 |  |
| 55 | 4 | 1 | 1 | 1.8964 | 1.8962 |
| 60 | 2 | 4 | 1 | 1.8878 | 1.8878 |
| 50 | 1 | 4 | 2 | 1.8802 | 1.8801 |
| 60 | 4 | 2 | 0 | 1.8267 | 1.8268 |
|  | 3 | 1 | 3 | 1.8261 |  |
| 20 | 0 | 2 | 4 | 1.7904 | 1.7902 |
| 10 | 4 | 0 | 2 | 1.7832 | 1.7831 |
| 15 | 3 | 3 | 2 | 1.7704 | 1.7702 |
| 75 | 2 | 0 | 4 | 1.7577 | 1.7573 |
|  | 2 | 3 | 3 | 1.7595 |  |
| 40 | 4 | 1 | 2 | 1.7480 | 1.7483 |
|  | 1 | 2 | 4 |  | 1.7472 |
| 20 | 2 | 4 | 2 | 1.7420 | 1.7417 |
| 10 | 1 | 5 | 0 | 1.7381 | 1.7378 |
| 15 | 2 | 1 | 4 | 1.7241 | 1.7240 |

EXAMPLE 16

A composition with formula of $Hg_2P_3Br_{0.5}Cl_{0.5}$ was prepared by sealing a mixture of HgCl (1.0572 g), $HgBr_2$ (0.4036 g), Hg (1.1230 g), and P (0.4162 g) in vacuo in a heavy-walled silica tube and heating in a pressure vessel under 100 atmospheres back-up nitrogen pressure for 12 hours at 450°C, then slowly cooling over a 12-hour period to 200°C, and finally to room temperature. The product consisted principally of black crystals from which other phases were extracted by treatment with aqua regia. Data obtained by chemical analysis corresponded to a formula of $Hg_2P_3Br_{0.5}Cl_{0.5}$. Calcd: P, 16.84; Br, 7.25; Cl, 3.21. Found: P, 16.34; Br, 7.07; Cl, 3.48. The x-ray powder pattern showed that the crystals had a monoclinic $Hg_2P_3Cl$-type structure with dimensions shifted in the direction of larger cell size, i.e., with $a = 7.881A.$, $b = 8.907 A.$, $c = 7.603A.$, $\beta = 98.37$, and $V = 528.6A^3$.

EXAMPLE 17

A material of orthorhombic $Hg_2P_3Br$-type structure with composition approximating $Hg_2P_3Br_{0.7}Cl_{0.3}$ was obtained by reaction of $HgBr_2$, HgCl, Hg, and P in quantities equivalent to 2:3:0.7:0.3 formula weight ratio of Hg:P:Br:Cl. The mixture of 0.3375 g (0.000936 mole) of $HgBr_2$, 0.1895 g (0.00803 mole) of HgCl, 0.7245 g (0.003612 g atom) of Hg and 0.2485 g (0.008024 g atom) of P, was sealed in vacuo in a heavy-walled silica tube and heated in a metal pressure vessel at 500°C. for 10 hours (100 atmospheres back-up pressure). The tube was cooled to 300°C. over a 10-hour period and then to room temperature. The product consisted largely of black shiny crystals and was separated from excess Hg by washing with aqua regia. The X-ray diffraction powder pattern was of orthorhombic $Hg_2P_3Br$-type with $a = 7.978A.$, $b = 8.862A.$, $C = 7.799A.$, and $V = 551.4A^3$. The product had a resistivity at 298°K of 8 ohm-cm and an activation energy, $E_a$, of 0.22 eV.

EXAMPLE 18

This example illustrates the preparation of a material approximating $Hg_2P_3Br_{0.9}Cl_{0.1}$ in composition by reaction of $HgBr_2$, HgCl, Hg, and P in 2:3:0.9:0.1 formula weight ratio of Hg:P:Br:Cl. A mixture of $HgBr_2$ (0.4271 g, 0.001185 mole), HgCl (0.0622 g, 0.000263 mole), Hg (0.765 g, 0.003818 g atom), and P (0.2447 g, 0.007901 g atom) was sealed in vacuo in a heavy-walled silica tube and reacted, cooled, and washed as described in Example 17. The X-ray diffraction powder pattern showed that the crystals had the orthorhombic $Hg_2P_3Br$-type structure. Cell constants were: A = 7.975A, B = 8.871A, C = 7.813A, and $V = 552.7A^3$. The resistivity, $\rho 298°K$, was $1 \times 10^{-1}$ ohm-cm.

EXAMPLE 19

Mercuric bromide (0.4709 g, 0.001307 mole), mercury (0.7863 g, 0.00392 g atom), and phorphorus (0.2428 g, 0.00784 g atom) were sealed in vacuo in a heavy walled silica tube (wall thickness of 2 mm). The tube was placed in a horizontal pressure vessel, pressured with 100 atmospheres of nitrogen back-up pressure, and heated at 500°C for 10 hours. Temperature was then gradually lowered to 300°C over a 10-hour period and finally to room temperature. The product consisted almost entirely of black crystals. Impurities were extracted with nitric acid. The purified product was judged to be $Hg_2P_3Br$ by its x-ray diffraction powder pattern, and this was confirmed by analysis. Calcd. for $Hg_2P_3Br$: Hg, 69.89; P, 16.19; Br, 13.92. Found: Hg, 70.1; P, 16.8; Br, 13.5. Density: found, 6.812 g/cm³; calcd. for $4Hg_2P_3Br$/cell, 6.822 g/cm³. By emission spectrography, impurities were: B, 100–500 ppm; Cu, 50–250 ppm; Mg, Mn, 2–10 ppm; and Si,Fe, 1–5 ppm. The boron and copper may be considered as doping elements.

EXAMPLE 20

A mixture of HgCl (8.9146 g, 0.0378 mol), Hg (7.5757 g, 0.0378 g atom), and P (3.5094 g, 0.1133 g atom) was sealed in vacuo in a silica tube approximately 15 cm in length by 15 mm outside diameter. The tube had a wall thickness of about 2.5 mm and a measured capacity of about 8 ml. The tube and contents were heated for 10 hours in a horizontal position in a pressure vessel at 500°C. using 150 atmospheres back-up pressure, then gradually cooled over a 20-hour period to 300°C. and, finally, rapidly to room temperature. The tube contained, principally, black shiny crystals of $Hg_2P_3Cl$ with some excess Hg, $PCl_3$, and P. The impurities were extracted with nitric acid, leaving $Hg_2P_3Cl$ which was identified by its x-ray diffraction powder pattern.

EXAMPLE A

As shown by the photoconductive response to visible light of the $Cd_2P_3Cl$ of Example 1, the $Cd_2P_3Br$ of Example 3, the $Cd_2P_3I$ of Example 4, the $Cd_2P_3Cl_{0.74}I_{0.26}$ of Example 6, the indium- and copper-doped $Cd_2P_3Cl$ of Examples 12 and 13, and the compositions of examples 14 and 15, some of the phosphide halides of the invention may be used to detect and measure the intensity of visible light. This may be accomplished by connecting crystals of compacts (highly compacted masses in the form of bars or pellets, etc.) of the products in series in an electrical circuit comprising (1) a source of current, (2) said crystal or compact having a voltmeter connected across it, (3) a resistor to modulate the electric current, and (4) if desired, an ohm-meter. As the intensity of light falling on the photoconductive material increases, its electrical resistance decreases. Consequently both the voltmeter and the ohm-meter readings may be used to indicate the intensity of light falling on the phosphide halide.

The embodiments of the invention in which an exclusive property or privilege is claimed are defined as follows:

1. A semiconducting phosphide halide of the formula $$M_{2-y}Zn_yP_3X$$

wherein
M is Cd or Hg;
X is at least one member of the group Br, Cl and I when M is Cd; and at least one member of the group Br and Cl when M is Hg;
y is 0 to 1.2 when M is Cd and X is Cl, but otherwise is 0.

2. A composition of claim 1 containing a small amount of a dopant selected from the group consisting of $In^{3+}$, $Cu^{1+}$, $Ag^{1+}$, $Mg^{2+}$, $Mn^{2+}$, $S^{2-}$, $Se^{2-}$, and $Te^{2-}$.

3. A composition of claim 1 in which M is Cd.

4. A composition of claim 1 in which M is Hg.

5. The composition of claim 3 in which $y = 0$ and X is chlorine; $Cd_2P_3Cl$.

6. The composition of claim 3 in which $y = 0$ and X is bromine; $Cd_2P_3Br$.

7. The composition of claim 3 in which $y = 0$ and X is iodine; $Cd_2P_3I$.

8. The composition of claim 3 in which $y = 1.16$ and X is chlorine; $Cd_{0.84}Zn_{1.16}P_3Cl$.

9. The composition of claim 3 in which $y = 0.46$ and X is chlorine; $Cd_{1.54}Zn_{0.46}P_3Cl$.

10. The composition of claim 3 in which $y = 0.16$ and X is chlorine; $Cd_{1.84}Zn_{0.16}P_3Cl$.

11. The composition of claim 3 in which $y = 0$ and X is 0.74 chlorine and 0.26 iodine; $Cd_2P_3Cl_{0.74}I_{0.26}$.

12. The composition of claim 3 in which $y = 0$ and X is 0.58 chlorine and 0.42 bromine; $Cd_2P_3Cl_{0.58}Br_{0.42}$.

13. The composition of claim 3 in which $y = 0$ and X is 0.59 bromine and 0.41 iodine; $Cd_2P_3Br_{0.59}I_{0.41}$.

14. The composition of claim 3 in which $y = 0$ and X is 0.83 bromine and 0.17 iodine; $Cd_2P_3Br_{0.83}I_{0.17}$.

15. The composition of claim 4 in which $y = 0$ and X is Cl; $Hg_2P_3Cl$.

16. The composition of claim 4 in which $y = 0$ and X = Br; $Hg_2P_3Br$.

17. The composition of claim 4 in which $y = 0$ and X is 0.5 Br and 0.5 Cl; $Hg_2P_3Br_{0.5}Cl_{0.5}$.

* * * * *